United States Patent [19]

Galbraith

[11] Patent Number: 4,500,613

[45] Date of Patent: Feb. 19, 1985

[54] ELECTROCHEMICAL CELL AND METHOD

[75] Inventor: Andrew D. Galbraith, Los Altos, Calif.

[73] Assignee: Lockheed Missiles & Space Company, Inc., Sunnyvale, Calif.

[21] Appl. No.: 589,308

[22] Filed: Mar. 14, 1984

[51] Int. Cl.³ .............................................. H01M 2/38
[52] U.S. Cl. ....................................... 429/69; 429/14; 429/50; 429/72
[58] Field of Search ....................... 429/69, 68, 67, 72, 429/70, 14, 13, 51, 50

[56] References Cited

U.S. PATENT DOCUMENTS

| 3,730,776 | 5/1973 | Geisler, Jr. | 136/100 R |
| 3,791,871 | 2/1974 | Rowley | 136/100 R |
| 4,007,057 | 2/1977 | Littauer et al. | 429/57 |
| 4,269,907 | 5/1981 | Momyer et al. | 429/67 |
| 4,364,806 | 12/1982 | Rogers | 204/98 |

OTHER PUBLICATIONS

Halberstadt, "The Lockheed Power Cell", in Eighth Intersociety Energy Conversion Engineering Conference Proceedings, 1973.

Primary Examiner—Charles F. LeFevour
Attorney, Agent, or Firm—Wood, Dalton, Phillips, Mason & Rowe

[57] ABSTRACT

A rotating cathode cell is provided with a lithium anode. An acid oxidizing agent and an aqueous electrolyte are supplied to the moving cathode surface such that they are carried to the electrochemical junction between the anode and the cathode. The acid oxidizer continuously dissolves the layer of reaction product (LiOH) forming on the anode, improving the power output per unit weight of the cell.

15 Claims, 2 Drawing Figures

ELECTROCHEMICAL CELL AND METHOD

BACKGROUND OF THE INVENTION

1. Field of the Invention

This invention relates generally to methods of generating electricity at high rates in a dynamic electrochemical junction and to fuel cells utilizing such methods.

2. Description of the Prior Art

Fuel cells using highly reactive electrochemical materials are desirable because of their large power output per unit weight and volume. Prior fuel cells have been modified to incorporate these highly reactive materials by a variety of techniques to prevent electrical shorting and to prevent direct combination of reactive chemicals.

One effective means for controlling these inherently unstable high rate reactions is to design the cathode in a dynamic mode, such as taught in Geisler, Jr. U.S. Pat. No. 3,730,776 issued May 1, 1973, the disclosure of which is hereby incorporated by reference. The system of the Geisler, Jr. patent utilizes a rotating cathode adjacent a reactive alkaline metal (e.g. sodium) anode, and a supply of aqueous electrolyte to the junction between the anode and the cathode. This design, while controlling the reaction, also decreases the rate of reaction.

Lithium is a desirable anodic material because of its high energy density. When lithium is used as an anodic material with an aqueous electrolyte, however, a thick film of LiOH forms at the anode due to the low solubility of LiOH in water. This reduces the power density delivered by the cell. The LiOH layer can be removed by a sufficient flow of water but additional water increases the weight of the cell.

Acid oxidizers may be added to the fuel cell electrolyte to increase the power output of the cell. When acid oxidizers are added to a conventional static cell incorporating highly reactive electrochemical materials such as alkali metals, however, reaction rates are difficult, if at all possible, to control.

SUMMARY OF THE INVENTION

The present invention is directed to overcoming one or more of the problems described above.

According to the present invention, a rotating cathode cell is provided with a lithium anode. An acid oxidizing agent and an aqueous electrolyte are supplied to the moving cathode surface such that they are carried to the electrochemical junction between the anode and the cathode. The acid oxidizer continuously dissolves the layer of reaction product (LiOH) forming on the anode, improving the power output per unit weight of the cell.

Other objects and advantages will be apparent to those skilled in the art from the following detailed description taken in conjunction with the drawings and the appended claims.

DETAILED DESCRIPTION OF THE INVENTION

Figure 1:
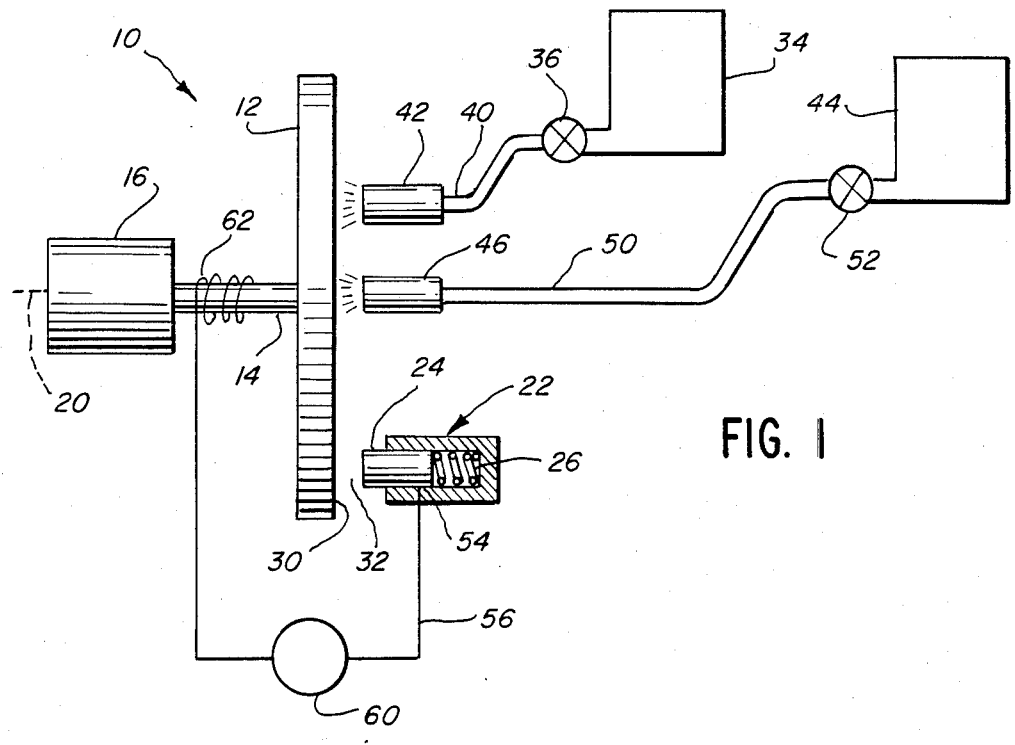
FIG. 1 is a partially sectional side view of one embodiment of an electrochemical fuel cell of the present invention; and, FIG. 2 is a three-dimensional view of the cell of FIG. 1.
Figure 2:
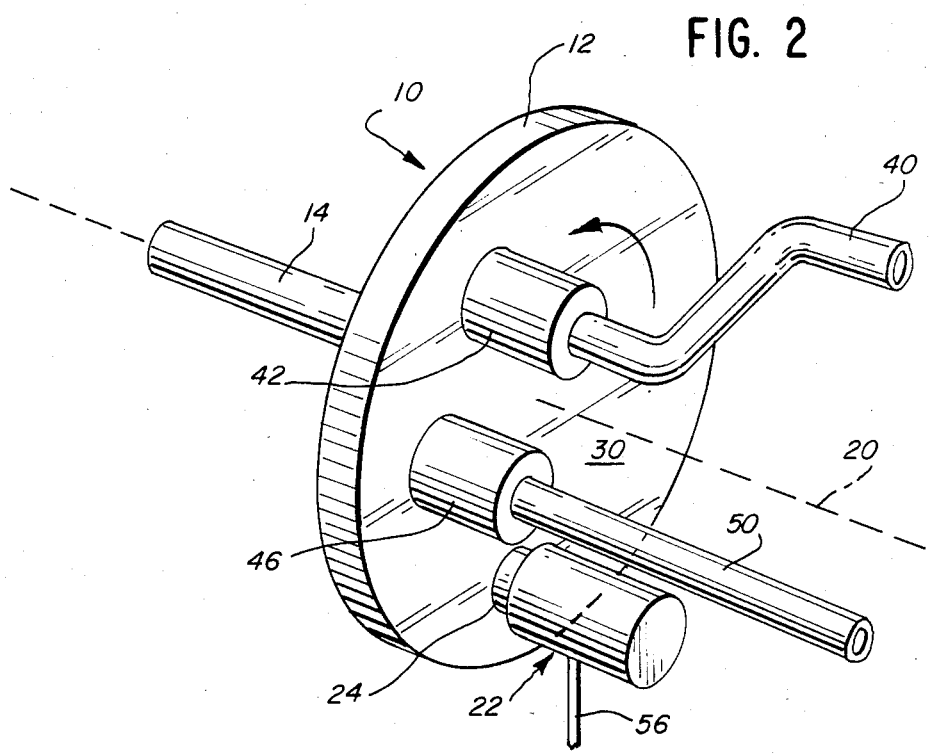

FIGS. 1 and 2 illustrate one embodiment of an electrochemical fuel cell in accordance with the present invention. The illustrated cell is similar in some respects to the cell disclosed in U.S. Pat. No. 3,730,776, but represents an improvement thereover. The discussion which follows is applicable to modifications which may be apparent to one skilled in the art.

The cell, generally designated 10, comprises a cathode 12 connected by a shaft 14 to a motor 16. The shaft 14 is mounted at the axis of rotation 20 of the cathode 12 such that operation of the motor 16 rotates the cathode 12 in a plane perpendicular to the shaft 14.

An anode assembly, generally designated 22, includes a lithium anode 24 which may move perpendicularly with respect to the plane of rotation of the cathode 12. As the anode 24 is consumed feed means, generally depicted by a spring 26, urge the anode 24 towards the cathode surface 30 in order to continuously supply lithium reactant to the reaction space 32 defined between the surface 30 and the anode 24.

The aqueous electrolyte is stored in suitable storage means such as a tank 34. During the operation of the cell, the flow of electrolyte is controlled by a valve 36 through a transmission line 40 to an application means 42 such as a brush, for example.

Acid oxidizer is stored in suitable storage means such as a tank 44. Flow to an applicator 46 through a transmission line 50 is controlled by a valve 52. Alternatively, electrolyte and acid oxidizer may be combined in a single storage means and supplied to the cell by a single transmission and application means.

Rotation of the cathode 12 continuously supplies the electrochemical junction 32 with aqueous electrolyte and acid oxidizer. Simultaneously, reaction products and heat are carried away by the cathode from the reaction site.

Electrical current is drawn through a contact 54 at the anode 24 to a suitable external electrical circuit 56. A load 60 is connected to the circuit 56, which is connected with the shaft 14 of the cathode 12 at a contact 62.

The reaction of lithium with aqueous electrolyte forms a film of lithium hydroxide at the anode 24. This film detrimentally affects the overall efficiency of the cell by increasing its internal resistance. Acid oxidizer continuously dissolves this lithium hydroxide layer to improve the overall reaction rate and thus power delivery of the cell.

Of the alkali metals, lithium is the most suitable anodic material for use in this invention. Its energy density, about 6,280 watt hours per pound, is significantly better than that of sodium, which is about 1,260 watt hours per pound. Sodium metal melts at about 98° C., a temperature below that of the boiling point of the electrolyte. If care is not taken to control temperature a sodium anode would melt. The melting point of lithium is about 181° C. When solid, sodium is a soft paste and a difficult material to work with. Also, since NaOH is more soluble in water than LiOH, the need for an acid oxidizer to remove this layer is correspondingly reduced.

Hydrochloric acid is a preferred acid oxidizer. The product of reaction, LiCl, does not pose the type of electrolyte management problems encountered in $Li/H_2O_2$ cells because of the high solubility of LiCl compared to LiOH. The high solubility of LiCl is most advantageous where an abundant supply of water is not available to dissolve the LiOH layer. Where water must be supplied, the reduced weight of water required to remove LiCl from the electrochemical junction, as opposed to LiOH, can be of great benefit. Use of hydrochloric acid as an oxidizer also provides much higher voltages then cells using oxygen. Hydrofluoric acid is also a suitable oxidizing agent.

Control over the output of the cell may be accomplished by adjusting the flow rates and/or concentrations of reactants supplied to the electrochemical junction. The concentration of the oxidizing agent in the tank 44 may be varied. Alternately, the supply valves 36 and 52 may be adjusted to control the mass flow rate and/or the concentration of acid oxidizing agent reaching the electrochemical junction 32.

The rate of delivery of acid oxidizer to the electrochemical junction can initially be selected to approximately stoichiometrically equal the rate at which LiOH is being formed. If this results in too high a reaction rate or if shorting occurs, the rate of delivery can be decreased. If the rate of LiOH removal is too low, the rate of delivery of acid oxidizer to the electrochemical junction can be increased.

The feed pressure on the anode may also be adjusted to control the output of the cell. The pressure should not be so great as to cause contact between the cathode and anode surfaces. If the gap is too great, however, the electrical power output of the cell will be reduced. As the gap between the cathode surface 30 and the anode 24 becomes too great the electrochemical resistance of the cell is increased, resulting in an increase in the rate of direct chemical reaction at the anode, increasing the production of heat and decreasing the power output of the cell.

The cathode 12 should be constructed of a material that provides good electron transfer, but does not readily react with lithium, aqueous electrolyte, the acid oxidizer, or the reaction product. It also should preferably be selected for a low hydrogen overpotential. Iron is a preferred cathode material.

Reation products may be removed through discharge passageways or other suitable means. Discharge may be made either to the environment or to storage means.

The foregoing detailed description is given for clearness of understanding only and no unnecessary limitations are to be understood therefrom as modifications within the scope of the invention will be obvious to those skilled in the art.

I claim:

1. An electrochemical cell comprising:
  a lithium anode;
  an electrically conductive rotatable cathode having a surface spaced from said anode to define an electrochemical junction;
  means for supplying an aqueous electrolyte that is reactive with lithium to said electrochemical junction;
  means for supplying an acid oxidizing agent to said electrochemical junction, said oxidizing agent having the ability to dissolve the products of the reaction between lithium and said electrolyte;
  means for moving said cathode surface transversely to said anode;
  means for urging said anode towards said cathode as said anode is consumed, yet maintaining the spacing between said anode and cathode a distance selected such that cathode-anode contact and excessive electrochemical resistance do not occur; and,
  an external circuit connecting said anode and said cathode.

2. The electrochemical cell of claim 1 wherein said acid oxidizing agent is hydrochloric acid.

3. The electrochemical cell of claim 1 wherein said acid oxidizing agent is hydrofluoric acid.

4. The electrochemical cell of claim 1 wherein said means for moving said anode comprises means for varying the force with which said anode is urged toward said cathode so as to vary the distance between said anode and said cathode.

5. The electrochemical cell of claim 1 wherein said supply of aqueous electrolyte is made at a position of the cathode such that said movement of said cathode carriers said electrolyte to the electrochemical junction.

6. The electrochemical cell of claim 1 wherein said aqueous electrolyte is water.

7. The electrochemical cell of claim 1 wherein said supply of acid oxidizing agent is made at a position of the cathode such that movement of the cathode carries said acid oxidizing agent to the electrochemical junction.

8. The electrochemical cell of claim 1 wherein said supply of aqueous electrolyte and said supply of acid oxidizing agent are combined to create a single supply stream.

9. The electrochemical cell of claim 1 wherein said cathode is constructed of a material that is selected for a low hydrogen overpotential.

10. The electrochemical cell of claim 1 wherein said cathode is constructed of a material that is resistant to reaction with either the reactants or products of the cell reaction.

11. The electrochemical cell of claim 1 wherein said cathode is constructed of iron.

12. The electrochemical cell of claim 1 wherein said movement of said cathode surface transversely to said anode is rotation of said cathode about an axis that is parallel to the line of movement of said anode toward said cathode.

13. A method of producing high current electrical energy comprising the steps of:
  moving an electrically conductive, electrochemically non-reactive low resistance cathode surface transversely to a lithium anode;
  spacing said anode from said cathode surface to form a thin electrochemical junction between said anode and said cathode surface;
  introducing to said electrochemical junction an aqueous electrolyte reactive with lithium;
  introducing to said electrochemical junction an acid oxidizing agent capable of dissolving the products of the reaction between lithium and said electrolyte; and
  drawing electrical current in an external electrical circuit connecting said anode and said cathode.

14. In a rotating cathode cell having means for moving the surface of an electrically conductive, electrochemically non-reactive low resistance cathode transversely to an alkali metal anode, means for spacing said anode from said cathode surface to form a thin electrochemical junction between said anode and said cathode surface, means for introducing to said electrochemical junction an aqueous electrolyte reactive with said alkali metal, and an external electrical circuit connecting said anode and said cathode, the improvement wherein said alkali metal is lithium and said cell includes means for introducing to said electrochemical junction an acid oxidizing agent capable of dissolving the products of the reaction between lithium and said electrolyte.

15. The improvement of claim 14 wherein said acid oxidizing agent is chosen from the group consisting of hydrofluoric acid and hydrochloric acid.

* * * * *